US008411933B2

(12) United States Patent
Uehori

(10) Patent No.: US 8,411,933 B2
(45) Date of Patent: Apr. 2, 2013

(54) IMAGE PROCESSING APPARATUS, IMAGE PROCESSING METHOD AND COMPUTER-READABLE MEDIUM

(75) Inventor: Yukiyo Uehori, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 877 days.

(21) Appl. No.: 12/432,800

(22) Filed: Apr. 30, 2009

(65) Prior Publication Data

US 2010/0111425 A1 May 6, 2010

(30) Foreign Application Priority Data

Oct. 31, 2008 (JP) ................................. 2008-281982

(51) Int. Cl.
*G06K 9/00* (2006.01)

(52) U.S. Cl. ........ 382/154; 382/181; 382/200; 715/788; 715/740

(58) Field of Classification Search .................. 715/788, 715/740, 746; 382/181, 200
See application file for complete search history.

(56) References Cited

U.S. PATENT DOCUMENTS

| 5,936,742 | A | * | 8/1999 | Horiuchi et al. | ............. | 358/400 |
| 5,973,686 | A | * | 10/1999 | Shimogori | ..................... | 715/746 |
| 6,057,842 | A | * | 5/2000 | Knowlton et al. | ............ | 715/788 |
| 6,313,822 | B1 | * | 11/2001 | McKay et al. | ................ | 345/698 |
| 6,580,436 | B1 | | 6/2003 | Hisada et al. | | |
| 7,327,349 | B2 | | 2/2008 | Robbins et al. | | |
| 7,600,189 | B2 | * | 10/2009 | Fujisawa | ....................... | 715/765 |
| 7,773,808 | B2 | * | 8/2010 | Lim et al. | ...................... | 382/181 |
| 7,840,035 | B2 | * | 11/2010 | Takeda et al. | ................ | 382/118 |
| 8,002,633 | B2 | * | 8/2011 | Shimizu | .......................... | 463/31 |
| 2004/0070620 | A1 | | 4/2004 | Fujisawa | | |
| 2004/0125423 | A1 | * | 7/2004 | Nishi et al. | .................... | 358/537 |
| 2005/0091607 | A1 | * | 4/2005 | Satou et al. | .................... | 715/788 |
| 2006/0158545 | A1 | | 7/2006 | Hirai | | |
| 2008/0175377 | A1 | * | 7/2008 | Merrill | ............................ | 380/30 |
| 2009/0164909 | A1 | * | 6/2009 | Satou et al. | .................... | 715/740 |
| 2010/0026894 | A1 | * | 2/2010 | Osawa | .......................... | 348/564 |

FOREIGN PATENT DOCUMENTS

| CN | 1274124 A | 11/2000 |
| CN | 1808557 A | 7/2006 |
| JP | 62-99789 A | 5/1987 |
| JP | 2005-165506 A | 6/2005 |
| JP | 2005-316955 A | 11/2005 |
| JP | 2006-209553 A | 8/2006 |
| JP | 2007-226597 A | 9/2007 |

OTHER PUBLICATIONS

Japanese Office Action issued on Sep. 14, 2010 in the corresponding Japanese Patent Application No. 2008-281982.

* cited by examiner

*Primary Examiner* — Vu Le
*Assistant Examiner* — Aklilu Woldemariam
(74) *Attorney, Agent, or Firm* — Sughrue Mion, PLLC

(57) ABSTRACT

An image processing apparatus includes an extracting unit, a detecting unit, a selecting unit and a change control unit. The extracting unit extracts a first part of an image that is a processing target, as a display area. The detecting unit sets a second part of the image as a detection target area and detects a boundary of an image element included in the detection target area. The selecting unit selects one of sides that constitute the detected boundary. The change control unit receives a command for changing the display area and changes the display area to a position in which the selected side is matched with one side of the display area.

24 Claims, 15 Drawing Sheets

| Priority | Coordinate information |
|---|---|
| 1 | $(x_1, y_1) - (x_2, y_2)$ |
| 2 | $(x_3, y_3) - (x_4, y_4)$ |
| ⋮ | ⋮ |

FIG. 10

Used Cartridge Pick-Up Request (charge-free)

[Please complete necessary information and fax this sheet.]

| Your Name (Company Name) | Person in Charge |
|---|---|
|  |  |

| ZIP Code | Address (Residence) |
|---|---|
|  |  |

| Building Name | Department Name |
|---|---|
| Phone | Fax |

| Desired Pickup Date | Number of Boxes | Wrapping State |
|---|---|---|
|  |  | With Box/Without Box (Please mark O in a corresponding entry) |

We recommend use of the genuine cartridges

To customers
For a cartridge other than the genuine cartridges, we do not conduct any quality test, and cannot guarantee the operating quality.
For XYZ printer, we recommend use of the genuine cartridges that are designed for acquiring a superior printing quality.

FAX (toll-free) 866-2xx-xxxx
To XYZ product center (pickup reception)

IMAGE PROCESSING APPARATUS, IMAGE PROCESSING METHOD AND COMPUTER-READABLE MEDIUM

CROSS-REFERENCE TO RELATED APPLICATIONS

This application is based on and claims priority under 35 USC 119 from Japanese Patent Application No. 2008-281982 filed on Oct. 31, 2008.

BACKGROUND

Technical Field

The invention relates to an image processing apparatus, an image processing method, a computer-readable medium and a computer data signal.

SUMMARY

According to an aspect of the invention, an image processing apparatus includes an extracting unit, a detecting unit, a selecting unit and a change control unit. The extracting unit extracts a first part of an image that is a processing target, as a display area. The detecting unit sets a second part of the image as a detection target area and detects a boundary of an image element included in the detection target area. The selecting unit selects one of sides that constitute the detected boundary. The change control unit receives a command for changing the display area and changes the display area to a position in which the selected side is matched with one side of the display area.

BRIEF DESCRIPTION OF THE DRAWINGS

Exemplary embodiments of the invention will be described in detail based on the following figures, wherein:

FIG. 10 is an explanatory diagram showing the operation example of the image processing apparatus according to the exemplary embodiment of the invention;

DETAILED DESCRIPTION

Figure 1:
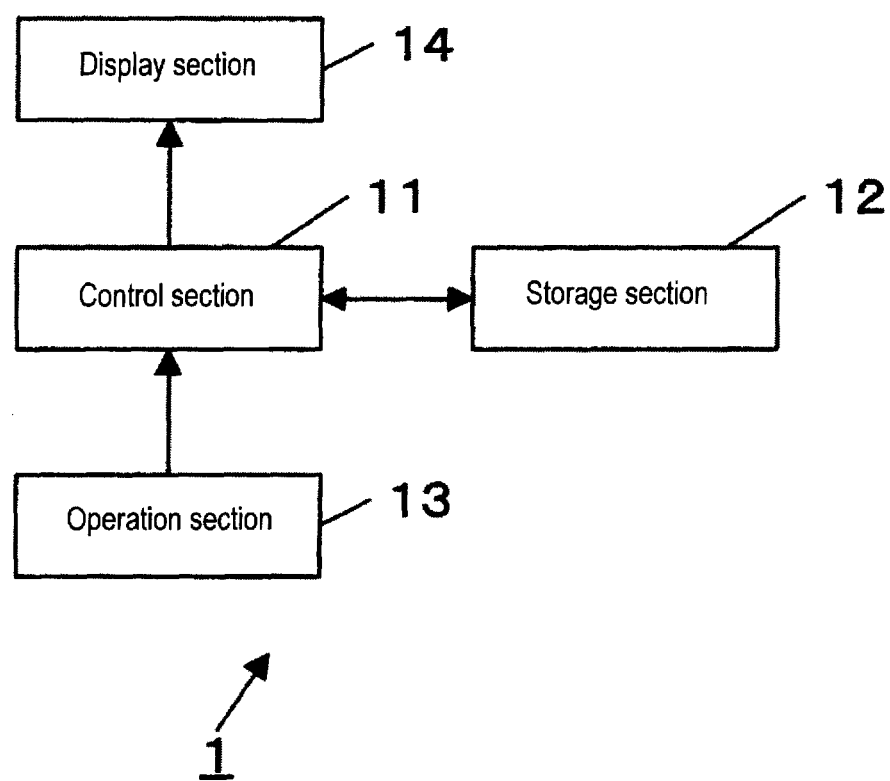
FIG. 1 is a configuration block diagram showing an example of an image processing apparatus according to an exemplary embodiment of the invention.

Exemplary embodiments of the invention will be described with reference to the accompanying drawings. An image processing apparatus 1 according to this exemplary embodiment, as exemplified in FIG. 1, is basically configured to include a control section 11, a storage section 12, an operation section 13 and a display section 14.

The control section 11 is a program control device such as a CPU (Central Processing Unit) and operates in accordance with a program that is stored in the storage section 12. This control section 11 extracts a part of an image, which is a display processing target and is an area having a size displayable on the display section 14, as a display area. In addition, this control section 11 receives a command for changing the display area and moves the display area. In one example of this exemplary embodiment, the control section 11 detects a boundary of an image element that is included in the image of the display processing target as a movement target and moves the display area so that the movement target matches a predetermined position in the display area. A detailed process of this control section 11 will be described later.

The storage section 12 stores programs that are executed by the control section 11. The programs may be provided in the form that they are stored inn a computer-readable recording medium such as a CD-ROM (Compact Disc-Read Only Memory) or a DVD-ROM (Digital Versatile Disc-Read Only Memory), and then may be copied into the storage section 12.

The operation section 13 such as a keyboard receives the command for changing the display area to an upper side, a lower side, a left side or a right side from a user and outputs the command to the control section 11. The display section 14 such as a display device displays at least a part of an image in accordance with the command input from the control section 11.

Figure 2:
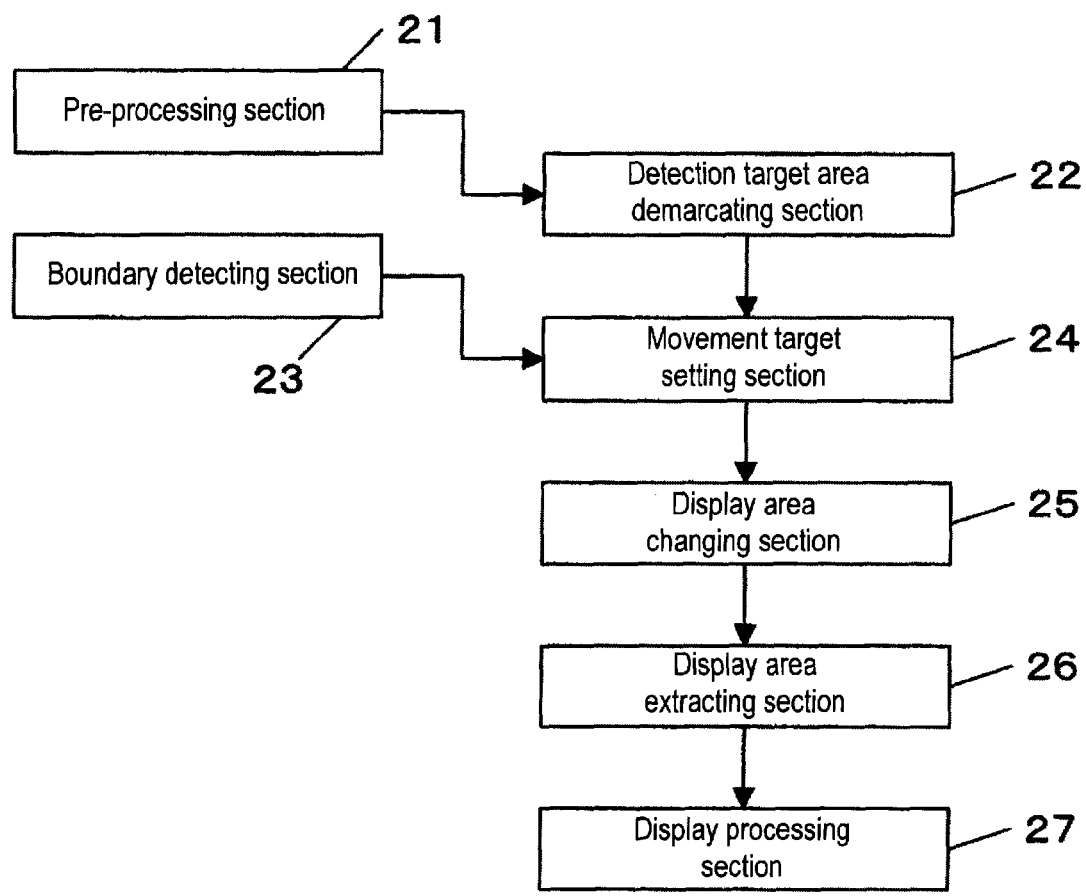
FIG. 2 is a functional block diagram showing an example of the image processing apparatus according to the exemplary embodiment of the invention.

The control section 11 according to this exemplary embodiment executes the programs, which are stored in the storage section 12. The control section 11, as shown in FIG. 2, is configured to include a pre-processing section 21, a detection target area demarcating section 22, a boundary detecting section 23, a movement target setting section 24, a display area changing section 25, a display area extracting section 26, and a display processing section 27, as functional sections.

The pre-processing section 21 acquires information about a reading direction in a character string area. Here, the reading direction, for example, may be acquired by receiving user's designation or by determining a used language based on the type of characters included in the character string area and acquiring information about a reading direction, which is associated in advance with the used language information acquired as the result of determination. This reading direction, for example, is set based on an arrangement direction ("from the left side to the right side") of characters in each line and an arrangement direction ("from the upper side to the lower side) of the lines.

The detection target area demarcating section 22 receives a command relating to the moving direction of the display area from a user and demarcates, based on the commanded moving direction, at least one detection target area located inside the current display area of the image of the processing target or around an outer circumference of the display area. Here, when the detection target area is demarcated inside the display area, the detection target area demarcating section 22 needs not set the entire display area as the detection target area and may demarcate a part of the display area as the detection target area based on the commanded moving direction.

For example, when the display area is a rectangular area represented by the upper left coordinates of (x, y) to the lower right coordinates of (x+w, y+h), the detection target area demarcating section 22 acquires a detection target area ratio rx for the widthwise direction and a detection target area ratio ry for the height direction, which are determined in advance, from the storage section 12 or the like. Then, in accordance with the command for moving the display area, the detection target area demarcating section 22 demarcates the detection target area based on the moving direction.

Figure 3A:
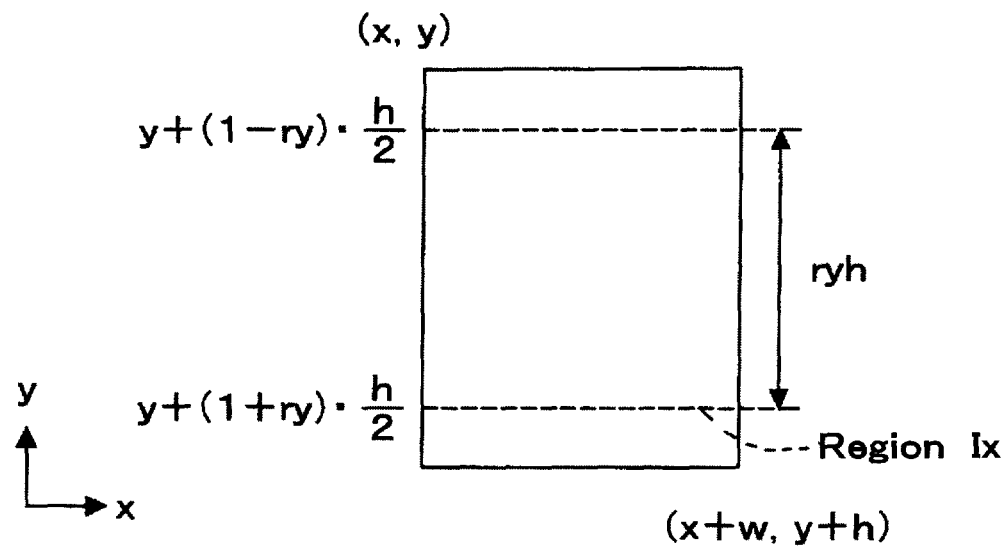
FIGS. 3A to 3C are explanatory diagrams showing examples of a detection target area that is determined by the image processing apparatus according to the exemplary embodiment of the invention.

As an example, when movement to the left or right side is commanded, the detection target area demarcating section 22, as shown in FIG. 3A, demarcates a rectangular area (hereinafter, referred to as an "area Ix") that is represented by the upper left coordinates of (x, y+(1−ry)×h/2) and the lower right coordinates of (x+w, y+(1+ry)×h/2) as the detection target area.

Figure 3B:
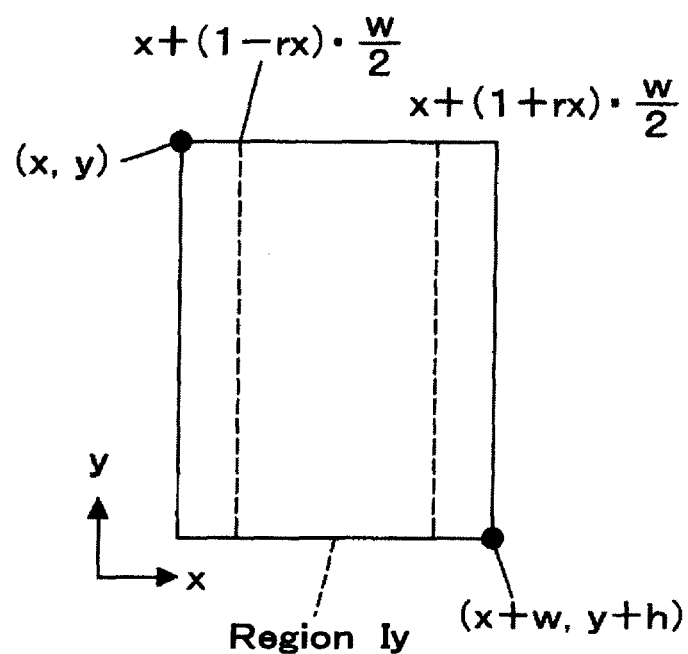

In addition, when movement to the upper or lower side is commanded, the detection target area demarcating section 22, as shown in FIG. 3B, demarcates a rectangular area (hereinafter, referred to as an "area Iy") that is represented by the upper left coordinates of (x+(1−rx)×w/2, y) and the lower right coordinates of (x+(1+rx)×w/2, y+h) as the detection target area.

In addition, the detection target area demarcating section 22 may be configured to demarcate a detection target area that is outside of the display area. In such a case, the detection target area demarcating section 22 demarcates a detection target area around the outer circumference of the display area, that is, a rectangular area of (x−w, y−h) to (x+w, y+h), so that a display area before movement and a display area after movement are at least partially overlapped with each other. In particular, when it is commanded to move to the right side, as exemplified in FIG. 3C, the detection target area demarcating section 22 may be configured to demarcate an area (hereinafter, referred to as an "area IIxr") of (x+w+Δx, y+(1−ry)×h/2) to (x+2w, y+(1+ry)×h/2) as the detection target area.

Figure 3C:
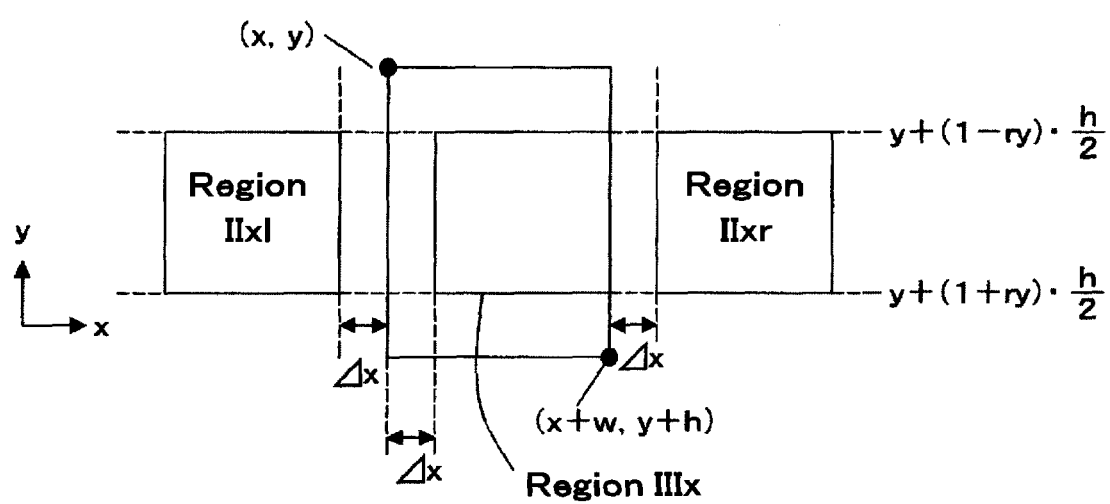

On the other hand, when it is commanded to move to the left side, as shown in FIG. 3C, the detection target area demarcating section 22 may be configured to demarcate an area (hereinafter, referred to as an "area IIxl") of (x−w, y+(1−ry)× h/2) to (x−Δx, y+(1+ry)×h/2) as the detection target area.

Figure 4:
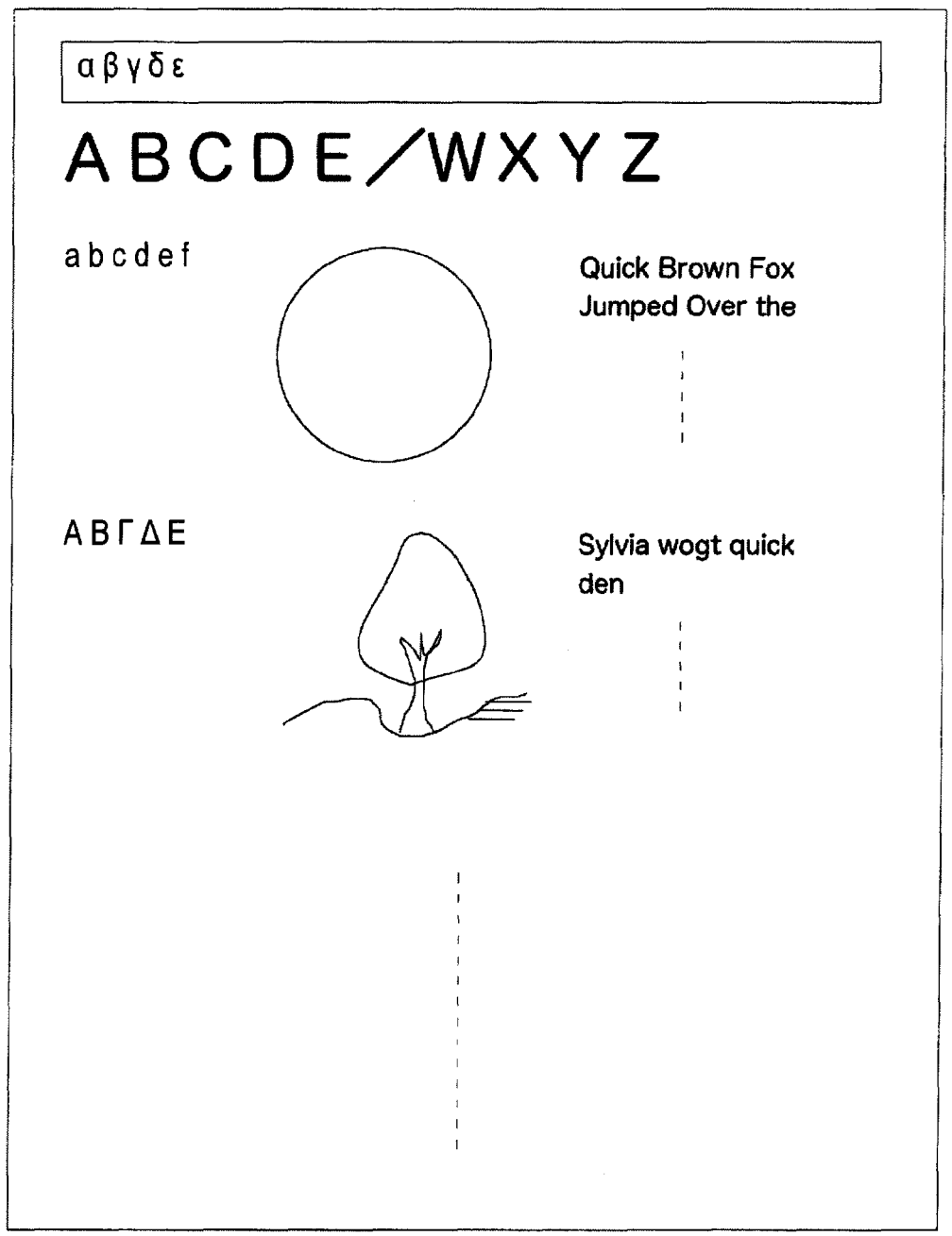
FIG. 4 is an explanatory diagram showing an example of an image (a processing target) that the image processing apparatus according to the exemplary embodiment of the invention processes.

The boundary detecting section 23 detects boundaries of image elements that are included in the image of the processing target. Here, the boundaries of image elements are determined as follows. That is, an image (a display processing target) that the image processing apparatus 1 according to this exemplary embodiment processes, generally, as shown in FIG. 4, is configured to include plural image elements such as a character string area, a picture area, and a line drawing area.

Thus, the boundary detecting section 23 detects a circumscribed rectangle of each area by using the following method. The image of the processing target, for example, is binarized, areas including continuous black pixels are detected, and circumscribed rectangles that circumscribe the continuous black pixel areas are detected. In addition, in the case where the circumscribed rectangles are partially overlapped with each other or the case where the continuous black pixels are presumed to constitute a character based on its size or the like, if a distance between both the circumscribed rectangles is within a predetermined distance, an additional circumscribed rectangle that circumscribes both the circumscribed rectangles overlapped with each other or both adjacent circumscribed rectangles is detected. As the above-described method of detecting a circumscribed rectangle, for example, a method that is known in a layout process or the like may be used. Thus, a detailed description thereof is omitted here.

Figures 5A, 5B:
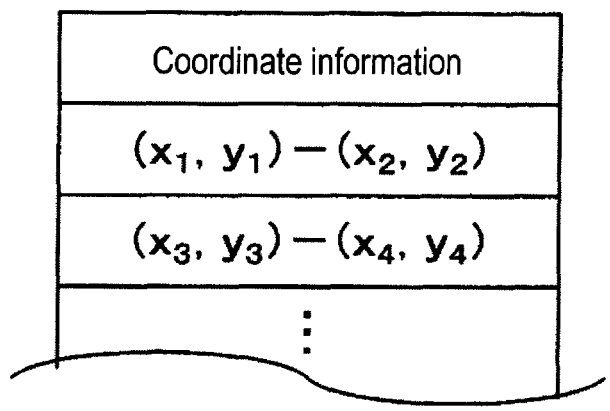
FIGS. 5A and 5B are explanatory diagrams showing examples of side information that is generated by the image processing apparatus according to the exemplary embodiment of the invention.

The boundary detecting section 23 sets segments of sides constituting the detected circumscribed rectangle as boundaries and stores information on the segments (for example, coordinate information of both ends thereof) representing each boundary in the storage section 12, as exemplified in FIG. 5A. It is noted that $x_2$, $y_2$, $x_3$, $y_3$, $x_4$ and $y_4$ correspond to the coordinate information of the both ends of the detection target area, which is demarcated as described above. Also, $(x_2, y_2)$ may represent the coordinate of the upper left corner of the rectangle, and $(x_3, y_3)$ may represent the coordinate of the lower right corner of the rectangle.

The movement target setting section 24 extracts boundaries, which are included in the area demarcated by the detection target area demarcating section 22, from among the boundaries detected by the boundary detecting section 23. Here, when there are plural extracted boundaries, the movement target setting section 24 sets one of the plural extracted boundaries as the movement target in accordance with a predetermined condition (for example, a condition regarding the moving amount such as a condition that the moving amount becomes the smallest).

The display area changing section 25 acquires boundary information of the movement target, which is set by the movement target setting section 24. Then, the display area is changed to a position in which the boundary of the movement target matches one side of the display area, based on the boundary information and the command relating to the moving direction from the user. For example, it is assumed that the moving direction input by the user is the left or right side, the X coordinate of the boundary line, which is set by the movement target setting section 24, as the movement target is ξ, the coordinates of the upper left corner of the display area before change are (x, y), and the coordinates of the upper left corner of the display area after change are (x', y'). In that case, the display area changing section 25 changes the display area to be (x', y')=(ξ, y) (for the case where the movement target is matched to the left side of the display area) or (x', y')=(ξ−w, y) (for the case where the movement target is matched to the right side of the display area). Here, w denotes the width of the display area.

In addition, whether the movement target is matched to the left corner or right corner of the display area may be determined based on the detection target area in which the boundary of the movement target is detected, as follows:

(1) When it is commanded to move to the right side, the movement target that is found out from the detection target area demarcated in the display area is matched to the left side of the display area.

(2) When it is commanded to move to the right side, the movement target that is found out from the detection target area demarcated outside of the display area is matched to the right side of the display area.

(3) When it is commanded to move to the left side, the movement target that is found out from the detection target area demarcated in the display area is matched to the right side of the display area.

(4) When it is commanded to move to the left side, the movement target that is found out from the detection target area demarcated outside of the display area is matched to the left side of the display area.

These also apply to the case of moving to the upper side or the lower side (the "left side" is rephrased as the "upper side", and the "right side" is rephrased as the "lower side").

The display area extracting section 26 extracts a part of an image included in the area set as the display area from the image of the display processing target and outputs it to the display processing section 27. Initially, the coordinates (x, y) of the upper left corner of the display area, for example, may be set to be matched to the coordinates (0, 0) of the upper left corner of the image. The display processing section 27 outputs the image extracted by the display area extracting section 26 to the display section 14 for display.

[Priorities of Sides]

The priorities of the sides constituting the boundaries of the image elements may be determined based on distances between the sides and the outer circumference of the image of the processing target and the reading direction of the character string, as follows. As an example, the boundary detecting section 23 determines the priorities of the detected sides as follows.

The boundary detecting section 23 selects one of the detected sides as a side in interest. Then, the boundary detecting section 23 determines which of the left side, the upper side, the right side, and the lower side of the circumscribed rectangle as the boundaries of the image element the side in interest corresponds to. In addition, the boundary detecting section 23 initially sets a priority of "2" to a side that is closer to a character that is read earlier (the left side and the upper side when the character string is read from the left side to the right side, and from the upper side to the lower side) with reference to the reading direction of the character string, which is detected by the pre-processing unit 21. The boundary detection section 23 initially sets a priority of "3" to the other sides.

Next, the boundary detecting section 23 checks which direction between the X-axis direction and the Y-axis direction the side in interest extends in. This can be checked by comparing coordinates of both ends of the side in interest. When the side in interest extends in the X-axis direction, that is, the side in interest, for example, is a segment having end points of $(Xa, Y)$ and $(Xb, Y)$, it is checked as to whether or not $Y<H/2$. Here, H denotes the height of the image of the processing target in the vertical direction.

Here, if $Y<H/2$, a rectangle having the upper left corner of $(Xa, 0)$ and the lower right corner of $(Xb, Y)$ is demarcated virtually, and it is checked as to whether or not at least a part of any other segment is included in the virtually demarcated rectangle. If any part of the other segments is not included, the side in interest is determined to be the segment closest to the outer circumference of the image, and therefore the priority of the side in interest is set to "1".

On the other hand, if $Y \geq H/2$, a rectangle having the upper left corner of $(Xa, Y)$ and the lower right corner of $(Xb, H)$ is demarcated virtually, and it is checked as to whether or not at least a part of any other segment is included in the virtually demarcated rectangle. If any part of the other segments is not included, the side in interest is determined to be a segment closest to the outer circumference of the image, and therefore the priority of the side in interest is set to "1".

Similarly, if the side in interest extends in the Y-axis direction, that is, the side in interest, for example, is a segment having end points of $(X, Ya)$ and $(X, Yb)$, it is checked as to whether or not $X<W/2$. Here, W denotes the height of the image of the processing target in the vertical direction.

If $X<W/2$, a rectangle having the upper left corner of $(0, Ya)$ and the lower right corner of $(X, Yb)$ is demarcated virtually, and it is checked as to whether at least a part of any other segment is included in the virtually demarcated rectangle. Here, if any part of the other segment is not included, the side in interest is determined to be a segment closest to the outer circumference of the image, and therefore the priority of the side in interest is set to "1". On the other hand, if $X \geq W/2$, a rectangle having the upper left corner of $(X, Ya)$ and the lower right corner of $(W, Yb)$ is demarcated virtually, and it is checked as to whether or not at least a part of any other segment is included in the virtually demarcated rectangle. Here, if any part of the other segments is not included, the side in interest is determined to be a segment closest to the outer circumference of the image, and therefore the priority of the side in interest is set to "1".

Figure 6:
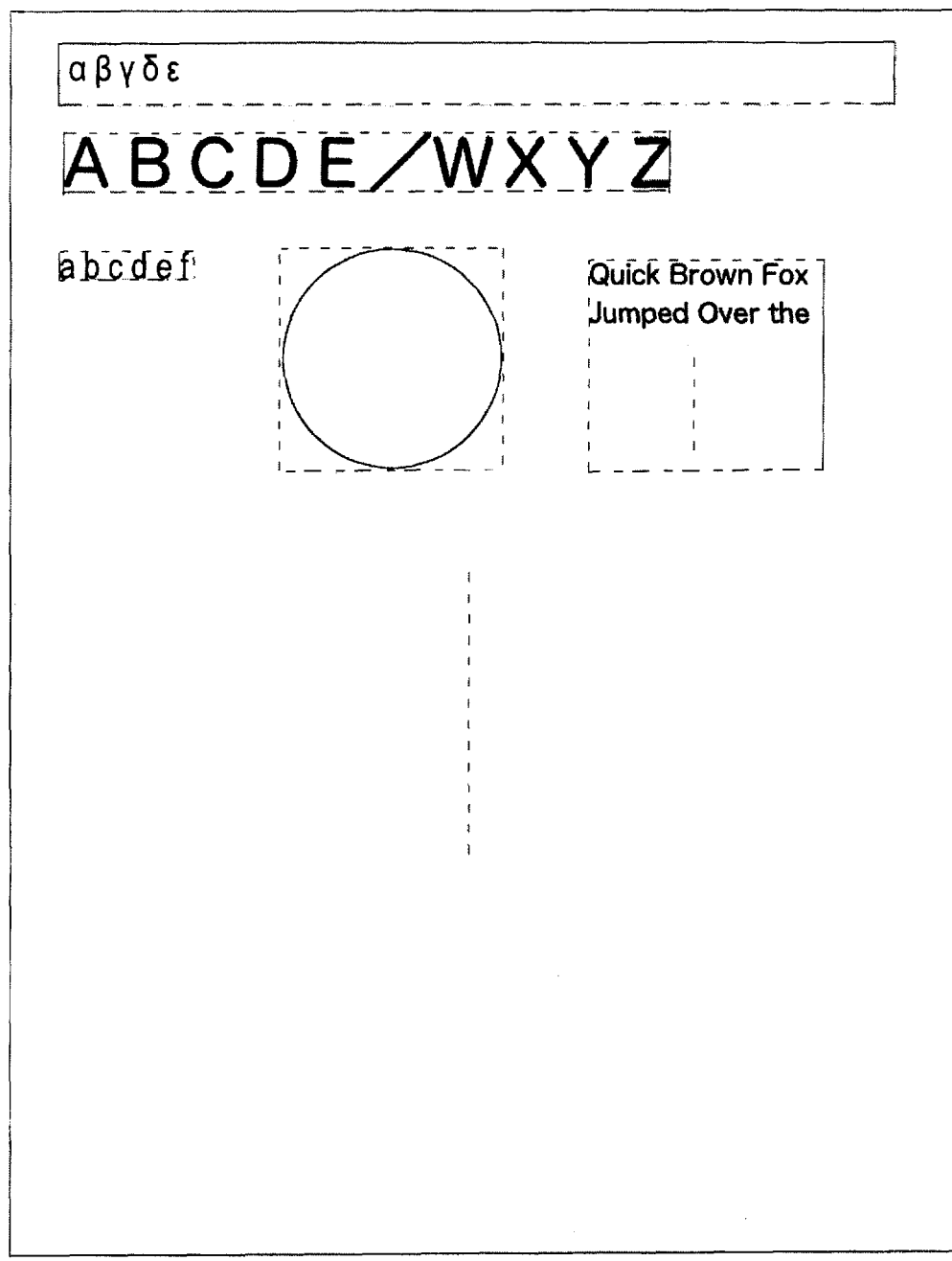
FIG. 6 is an explanatory diagram showing an overview of the side information, which is generated by the image processing apparatus according to the exemplary embodiment of the invention.

The boundary detecting section 23 stores the priority information of each side determined as above into the storage section 12 with the priority information of each side associated with information representing coordinates of both ends of the side (FIG. 5B). As one example, an example in which the priority information of each side is set for the image shown in FIG. 4 is shown in FIG. 6. In FIG. 6, each side that is closest to the outer circumference of the image has priority of "1" (denoted by the solid lines in the figure), sides that are other than the sides having priority of "1" and are located on the left or upper side on which characters that are read earlier are disposed in view of the reading direction have priority of "2" (denoted by the broken lines in the figure), and the remaining sides have priority of "3" (denoted by the dashed-dotted lines in the figure).

As described above, when priorities are assigned to the sides, the detection target area demarcating section 22 may be configured to demarcate the detection target area based on the priorities. In this example, the detection target area demarcating section 22 receives designation of priorities for sides to be searched and then demarcate the detection target area.

Hereinafter, an example of demarcating the detection target area will be described. In the example described below, it is assumed that the character string is arranged from the left side to the right side in each line, and the lines are arranged from the upper side to the lower side.

[Demarcating of Detection Target Area for Searching Priority of "1"]

When the detection target area is demarcated for the sides having the priority of "1", the detection target area demarcating section 22 demarcates different detection target areas depending on commanded moving directions.

In particular, when it is commanded to move to the right side, the detection target area demarcating section 22 demarcates the area Ix shown in FIG. 3A or the area IIxr shown in FIG. 3C as the detection target area. On the other hand, when it is commanded to move to the left side, the detection target area demarcating section 22 demarcates the area Ix shown in FIG. 3A. When it is commanded to move to the left side, the detection target area demarcating section 22 may demarcate the area IIxl together with the area Ix shown in FIG. 3A.

In addition, when it is commanded to move to the upper side, the detection target area demarcating section 22 demarcates the area Iy shown in FIG. 3B. When it is commanded to move to the upper side, the detection target area demarcating section 22 may demarcate the area IIyu together with the area Iy. On the other hand, when it is commanded to move to the lower side, the detection target area demarcating section 22 demarcates the area Iy shown in FIG. 3B and the area IIyd shown in FIG. 7.

[Demarcating of Detection Target Area for Searching Priority of "2"]

When the detection target area is demarcated for the sides having the priority of "2", the detection target area demarcating section 22 demarcate different detection target areas depending on commanded moving directions.

In particular, when it is commanded to move to the right side, the detection target area demarcating section 22 demarcates the area III shown in FIG. 3C. The area III is located in the display area and is an area in the range of coordinates $(x+\Delta x, y+(1-ry) \times h/2)$ to $(x+w, y+(1+ry) \times h/2)$.

In addition, when it is commanded to move to the left side, the detection target area demarcating section 22 demarcates the area IIx1 shown in FIG. 3C.

Figure 7:
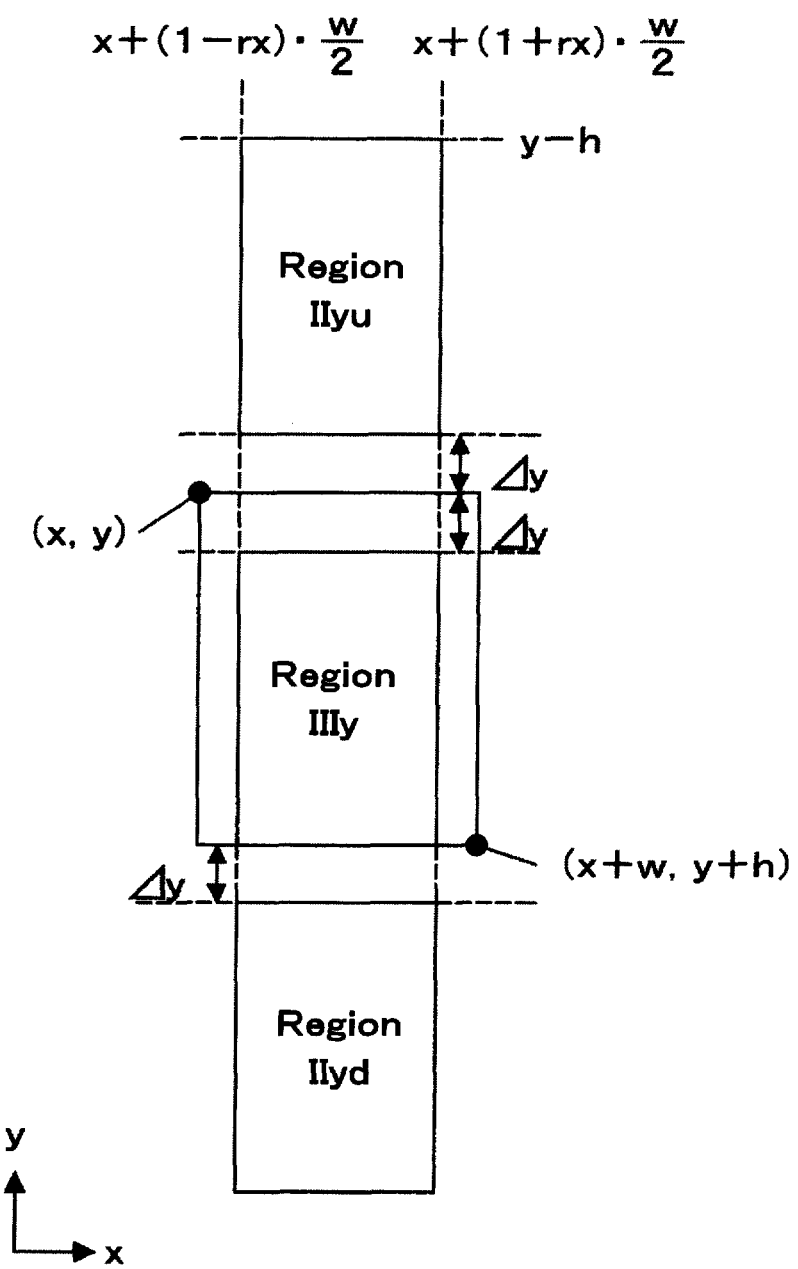
FIG. 7 is an explanatory diagram showing another example of the detection target area, which is determined by the image processing apparatus according to the exemplary embodiment of the invention.

In addition, when it is commanded to move to the upper side, the detection target area demarcating section 22 demarcates the detection target area IIyu shown in FIG. 7. On the other hand, when it is commanded to move to the lower side, the detection target area demarcating section 22 demarcates the detection target area IIIy and the detection target area IIyd that are shown in FIG. 7.

[Demarcating of Detection Target Area for Searching Priority of "3"]

When the detection target area is demarcated for the sides having the priority of "3", the detection target area demarcating section 22 demarcates different detection target areas depending on the commanded moving directions.

Specifically, when it is commanded to move to the right side, the detection target area demarcating section 22 demarcates the area IIxr shown in FIG. 3C. On the other hand, when it is commanded to move to the lower side, the detection target area demarcating section 22 demarcates the detection target area IIyd shown in FIG. 7. In the case where the detection target area is demarcated for the sides having priority of "3", when it is commanded to move to the left side or the upper side, the detection target area is not demarcated.

To sum up the descriptions above, a process of demarcating the detection target area is performed for each moving direction as shown in the following table.

TABLE 1

| | PROCESSING ORDER | | | | |
|---|---|---|---|---|---|
| MOVING DIRECTION | PRIORITY 1 | PRIORITY 1 | PRIOR-ITY 1 | PRIOR-ITY 2 | PRIOR-ITY 3 |
| LEFT | Ix | — | IIxl | IIxl | — |
| RIGHT | Ix | IIxr | IIIx | IIIx | IIxr |
| UPPER | Iy | — | IIyu | IIyu | — |
| LOWER | Iy | IIyd | IIIy | IIIy | IIyd |

As shown in this table, the image processing apparatus 1 according to this exemplary embodiment may sequentially demarcate detection target areas in the order from the detection target area located on the left side in the table and perform a process of detecting a side that is the movement target. In such a case, even for sides having the same priority of "1", a side included in the current display area is detected with priority.

[Operation of Movement Target Setting Section]

When the priority is determined for each side, the movement target setting section 24 operates as follows.

Figure 8A:
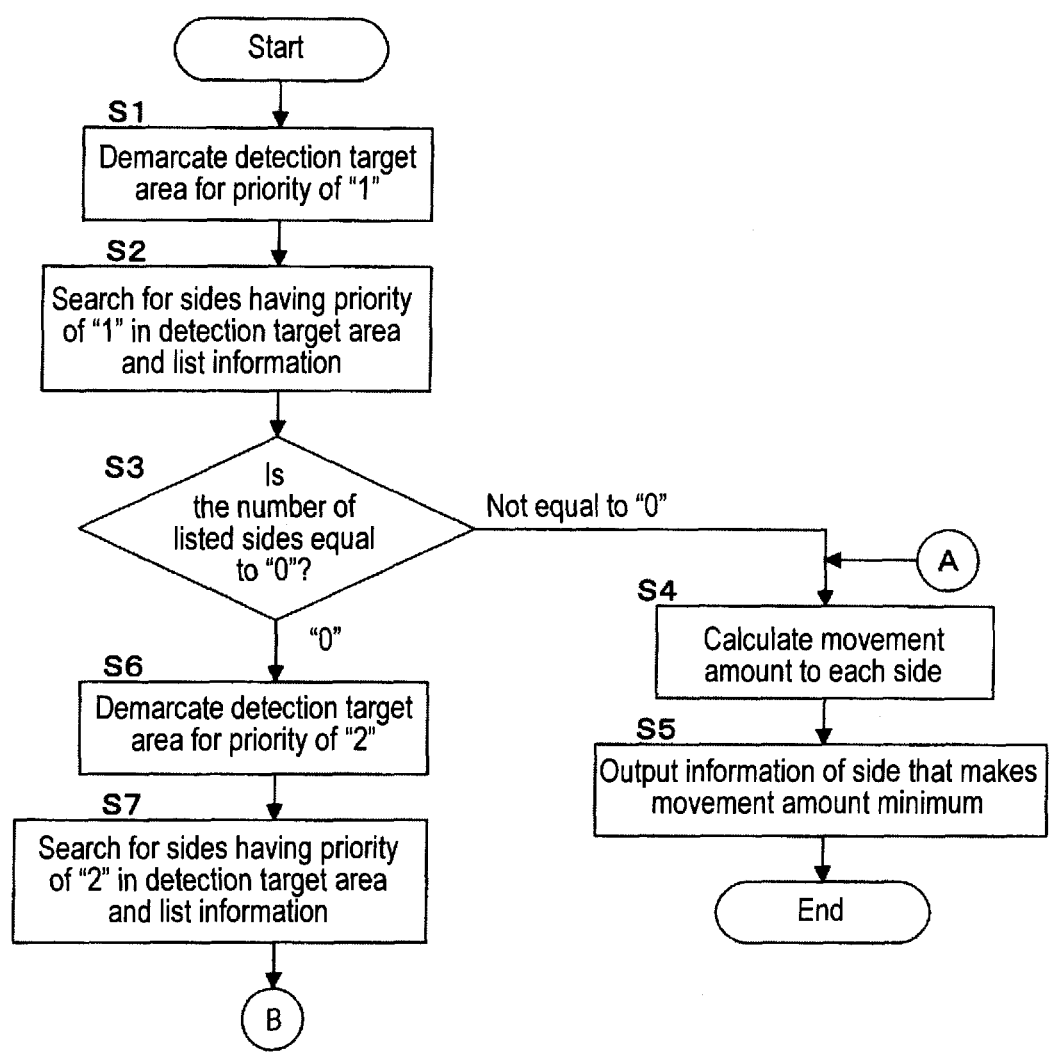
FIGS. 8A and 8B are a flowchart showing a processing example of the image processing apparatus according to the exemplary embodiment of the invention.
Figure 8B:
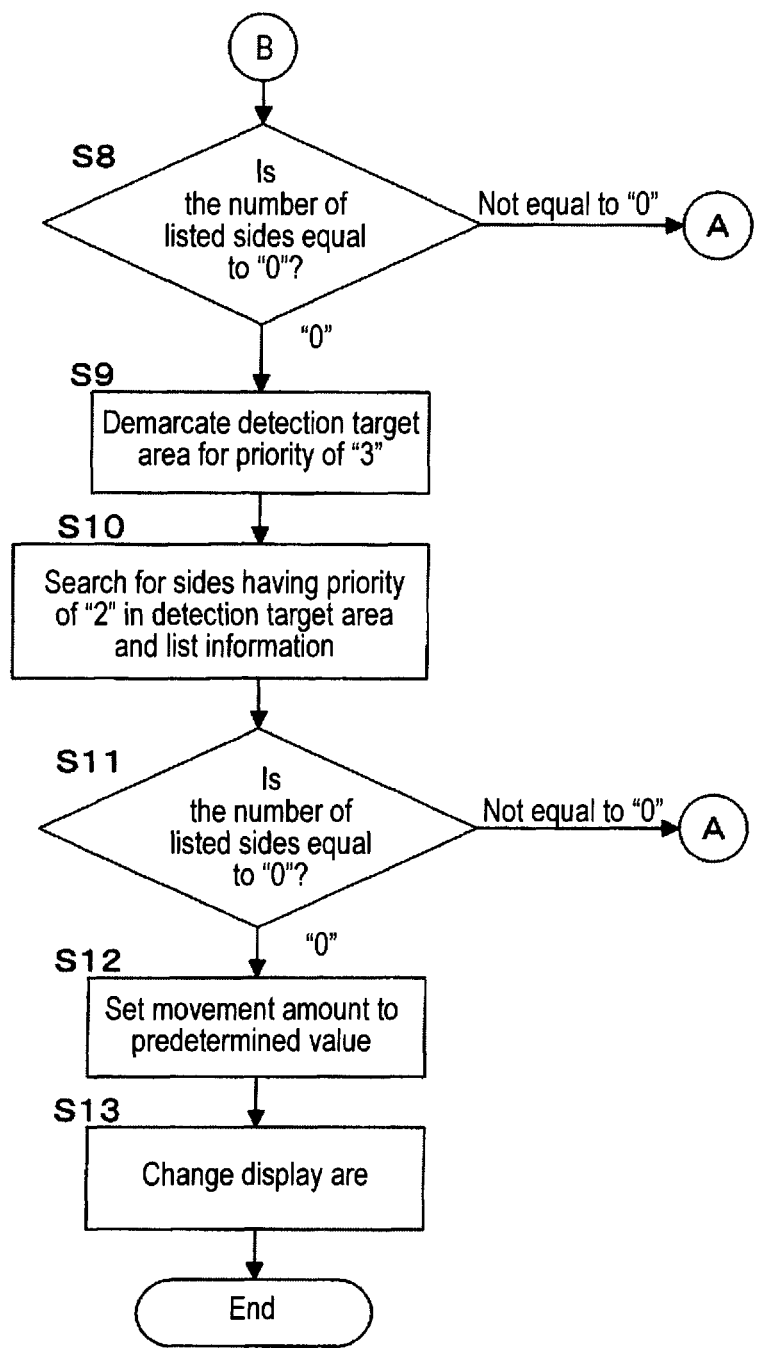

The movement target setting section 24 receives a movement direction input by the user, starts the process exemplified in FIG. 8, and outputs information about the movement direction according to the movement command and information indicating that the detection target area having priority of "1" is to be demarcated to the detection target area demarcating section 22 so as to demarcate the detection target area having priority of "1" (S1).

The movement target setting section 24 lists information of the sides, which have the priority of "1" and are included in the demarcated detection target area (S2). Then, the movement target setting section 24 checks as to whether the number of listed sides is equal to "0" (whether or not there is at least one side that has the priority of "1" and is included in the demarcated detection target area) (S3). If the number of sides is not equal to "0", moving amounts of the display area in cases where the end portion of the display area is made to be matched with the respective sides are calculated with reference to the information of the listed sides and current display area information (S4). Then, the information of the side, which makes the calculated moving amount be minimum is output to the display area changing section 25 (S5), and the process ends.

On the other hand, if the number of sides listed in the process of S3 is equal to "0" (if there is no side that has the priority of "1" and is included in the demarcated detection target area), the movement target setting section 24 outputs information indicating that the detection target area having the priority of "2" is to be demarcated to the detection target area demarcating section 22, so as to demarcate the detection target area having the priority of "2" (S6).

The movement target setting section 24 lists information of the sides, which have the priority of "2" and are included in the demarcated detection target area (S7). Then, the movement target setting section 24 checks as to whether the number of listed sides is equal to "0" (if there is at least one side that has the priority of "2" and is included in the demarcated detection target area) (S8). If the number of the sides is not equal to "0", the flow proceeds to the process of S4 so as to continue the process.

On the other hand, if the number of sides listed in the process of S8 is equal to "0" (if there is no side that has the priority of "2" and is included in the demarcated detection target area), the movement target setting section 24 outputs information indicating that the detection target area having the priority of "3" is to be demarcated to the detection target area demarcating section 22, so as to demarcate the detection target area having the priority of "3" (S9).

The movement target setting section 24 lists information of the sides, which have the priority of "3" and are included in the demarcated detection target area (S10). Then, the movement target setting section 24 checks as to whether the number of listed sides is equal to "0" (if there is at least one side that has the priority of "3" and is included in the demarcated detection target area) (S11). If the number of the sides is not equal to "0", the flow proceeds to the process of S4 so as to continue the process.

In addition, in the process of S11, if the number of listed sides is equal to "0" (if there is no side that has the priority of "3" and is included in the demarcated detection target area), the moving amount of the display area is set to a predetermined value (S12), the information of the moving direction, which is input from the user and information of the set moving amount are output to the display area changing unit 25, and the display area is changed by the predetermined moving amount in the commanded moving direction (S13), and the process ends.

In addition, in the above-described process, as the detection target area for the sides having the priority of "1", the area Ix and the area Iy (the detection target area that is included in the display area) are always included. However, the areas Ix and Iy may be included in the detection target area only if the display area is located in the end portion (for example, an end opposite to a direction designated as the moving direction; specifically, the left end when it is commanded to move to the right side) of the image of the processing target; otherwise, the area IIIx or IIIy may be included instead of Ix or Iy. This is based on that when the display area is located in the end portion of the image, the sides having the priority of "1" are often included in the area Ix or the area Iy.

The moving amount is calculated in the process of S4 as follows.

(1) When it is commanded to move to the right side, for the movement target found from the detection target area (the area Ix or IIIx), which is demarcated in the display area, in order to match the left side of the display area, |Xtarget−XLcurrent| that is an absolute value of a difference between the x coordinate Xtarget of the side of the found movement target and the x coordinate XLcurrent of the left side of the current display area is calculated as the moving amount.

(2) Similarly, when it is commanded to move to the right side, for the movement target found from the detection target area (the area IIxr), which is demarcated outside of the display area, in order to match the right side of the display area, |Xtarget−XRcurrent| that is an absolute value of a difference between the x coordinate Xtarget of the side of the found movement target and the x coordinate XRcurrent of the right side of the current display area is calculated as the moving amount.

(3) When movement to the left side is directed, for the movement target found from the detection target area that is demarcated in the display area, in order to match the right side of the display area, |Xtarget−XRcurrent| that is an absolute value of a difference between the x coordinate Xtarget of the side of the found movement target and the x coordinate XRcurrent of the right side of the current display area is calculated as the moving amount.

(4) When movement to the left side is directed, for the movement target found from the detection target area that is demarcated outside the display area, in order to match the left side of the display area, |Xtarget−XRcurrent| that is an absolute value of a difference between the x coordinate Xtarget of the side of the found movement target and the x coordinate XRcurrent of the right side of the current display area is calculated as the moving amount.

Similarly, for the movement to the upper or lower side, the moving amount is calculated as follows.

(1) When it is commanded to move to the lower side, for the movement target found from the detection target area (the area Iy or IIIy) that is demarcated in the display area, in order to match the upper side of the display area, |Ytarget−YUcurrent| that is an absolute value of a difference between the y coordinate Ytarget of the side of the found movement target and the y coordinate YUcurrent of the upper side of the current display area is calculated as the moving amount.

(2) When it is commanded to move to the lower side, for the movement target found from the detection target area (the area IIyd) that is demarcated outside the display area, in order to match the lower side of the display area, |Ytarget−YDcurrent| that is an absolute value of a difference between the y coordinate Ytarget of the side of the found movement target and the y coordinate YDcurrent of the lower side of the current display area is calculated as the moving amount.

(3) When it is commanded to move to the upper side, for the movement target found from the detection target area that is demarcated in the display area, in order to match the lower side of the display area, |Ytarget−YDcurrent| that is an absolute value of a difference between the y coordinate Ytarget of the side of the found movement target and the y coordinate YDcurrent of the lower side of the current display area is calculated as the moving amount.

(4) When it is commanded to move to the upper side, for the movement target found from the detection target area that is demarcated outside the display area, in order to match the upper side of the display area, |Ytarget−YUcurrent| that is an absolute value of a difference between the y coordinate Ytarget of the side of the found movement target and the y coordinate YUcurrent of the upper side of the current display area is calculated as the moving amount.

In addition, in the above description, the example in which the arrangement direction of the character string (reading direction) is directed from the left side to the right side in a line and is arranged from the upper side to the lower side in units of lines has been described. However, if the reading direction is different, the "left side" or the "upper side" can be replaced with a side being closer to a character that is read earlier, and the "right side" or the "lower side" can be replaced with a side being closer to a character that is read later.

Figure 9:
FIG. 9 is an explanatory diagram showing an example of an image that is used to explain an operation example of the image processing apparatus according to the exemplary embodiment of the invention.

The image processing apparatus 1 according to this exemplary embodiment configured as described above operates as exemplified below. In the following example, the case where the display process target is an image exemplified in FIG. 9 will be described. In the example of FIG. 9, the character string is arranged from the left side to the right side in a line and is arranged from the upper side to the lower side in units of lines. In addition, FIG. 9, a boundary of each image element is denoted by a circumscribed rectangle. Also, FIG. 9 shows a state in which priorities are assigned to the sides of each boundary. In other words, sides having the priority of "1" are denoted by solid lines, sides having the priority of "2" are denoted by broken lines, and sides having the priority of "3" are denoted by dashed-dotted lines.

The image processing apparatus 1 according to this exemplary embodiment receives the image exemplified in FIG. 9 as a processing target, and initially sets in the upper left corner thereof a display area (an area having a width w and a height h) that has the same number of pixels as that (w pixels in the width direction and h pixels in the height direction) of the display section 14 (R1 in FIG. 10). Then, a part of the image in this display area R1 is displayed on the display section 14. Here, when a user performs an operation for moving the display area to the right side, a detection target area Rs1 (an area Ix in R1) set in the display area R1 includes sides, having the priority of "1", of circumscribed rectangles Q1 and Q2 of image elements.

An operation for moving to the right side is performed, and the image processing apparatus 1 sets the movement target based on a side found from the detection target area, which is demarcated in the display area. Therefore, the image processing apparatus 1 is to match the left side of the display area with the movement target, and then compares (i) a distance r1 between the left side of the display area R1 and the left side of the circumscribed rectangle Q1, which is one candidate for the movement target, and (ii) a distance r2 between the left side of the display area R1 and the left side of the circumscribed rectangle Q2, which is another candidate for the movement target. Then, since the distance r1 is shorter than the distance r2, the image processing apparatus 1 matches the left side of the display area with the left side of the circumscribed rectangle Q1. Accordingly, the image processing apparatus 1 moves the display area to R2. Then, a part of the image in this display area R2 is displayed on the display section 14.

Figure 11:
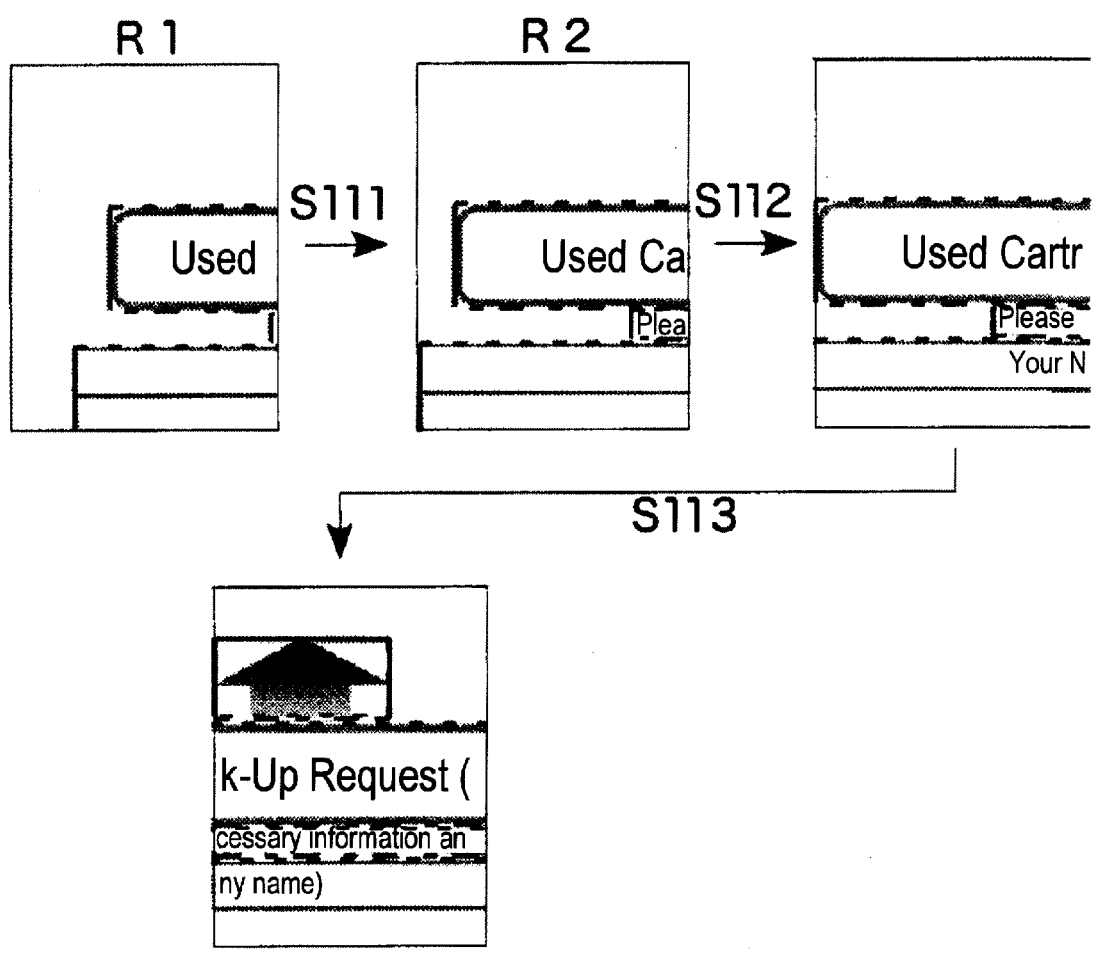
FIG. 11 is an explanatory diagram showing image display examples by the image processing apparatus according to the exemplary embodiment of the invention.

As a result, as shown in FIG. 11, what is displayed on the display section 14 is changed from the display content of the display area R1 to the display content of the display area R2 (S111). Also, thereafter, every time it is commanded to move to the right side (in the case where only if the display area is located in the end part of the image, the area Ix is demarcated), the detection target area is demarcated, and sides having the priority of "1" to "3" are searched for. For example, in the display area R2, a side (left side), having the priority of "1", of the circumscribed rectangle Q4 is found in the area Ix, and then the display area is moved to the right side until the left side of the display area matches the left side of the circumscribed rectangle Q2 (S112). Here, when it is further commanded to move to the right side, similarly, a side (left side), having the priority of "2", of the circumscribed rectangle Q4 is found in the area Ix, and then the display area is moved to the right side until the left side of the display area matches the left side of the circumscribed rectangle Q4 (not shown in the figure).

When it is further commanded to move to the right side, a left side R (having the priority of "1") of a rectangle that circumscribes the image of an arrow located in an uppermost part of the image shown in FIG. 10 is found in the detection target area IIxr, and then the display area is moved to the right side until the left side of the display area matches the left side R (S113 of FIG. 11).

In addition, when the display area is located in R3 shown in FIG. 10 and an operation for movement to the right side is performed, the image processing apparatus 1 demarcates a detection target area Rs2 (the area IIxr for R3) (in the case where only if the display area is located in the end portion of the image, the area Ix is demarcated) for searching for a side having the priority of "1". However, no side having the priority of "1" is included in the detection target area Rs2, and no side having the priority of "2" is included in the area IIIx (not shown in the figure) for the display area R3. Accordingly, a side having the priority of "3" is searched for from the detection target area Rs2.

Then, the image processing apparatus 1 finds the right side (a side having the priority of "3") of a circumscribed rectangle Q3. In other words, when it is commanded to move to the right side, the side of the display area is matched with a side found from the outside of the display area. Therefore, the right side of the display area is matched with the right side of the circumscribed rectangle Q3, and the display area is moved to a display area R4. Then, a part of the image in this display area R4 is displayed on the display section 14.

Figure 12:
FIG. 12 is another explanatory diagram showing the operation example of the image processing apparatus according to the exemplary embodiment of the invention.

In addition, when the display area is located in R5 shown in FIG. 12 and an operation for movement to the upper side is performed, a side having the priority of "2" is included in a detection target area Rs3. Accordingly, match the upper side of the display area to the side having the priority of "2", the image processing apparatus 1 moves the display area to R6. Then, a part of the image in this display area R6 is displayed on the display section 14.

Similarly, when a part of the image in the display area R7 is displayed and an operation for movement to the lower side is performed, a side, having the priority of "2", of Q5 is found in a detection target area IIIy for R7. Accordingly, in order to match the upper side of the display area to the upper side of Q5, the display area is moved (a display area R8 after movement). Then, a part of the image within this display area R8 is displayed on the display section 14.

MODIFIED EXAMPLES

Also, when the display area is located on the right end of an image that is the display process target and an operation for directing movement to the right side is performed, the display area may be returned to the left end of the image and is moved to the lower side by a predetermined moving amount. In this case, by repeatedly performing movement operations to the right side, the display area moves in order of scanned lines (moves one line from the left side to the right side and then moves to the left end of the next line located on the lower side of the previous line).

In addition, without repeatedly receiving operations from a user, the image processing apparatus may perform the process assuming that a movement operation to the right side is received each predetermined timing.

In the above description, it is assumed that the operation of a movement command, for example, is performed by pressing a key or the like. However, the operation of the movement command may be received by detecting a contact of a pen, a finger, or the like, for example, on a touch panel or the like that is superimposed on the display section 14. In addition, when the operation section 13 can detect the strength of pressing, for example, on a touch panel or the like, the position or the size of the detection target area may be changed in accordance with the detected strength. For example, as the strength of pressing increases, the area of the detection target area may be larger or the like.

In addition, here, the display area having a size corresponding to the number of pixels of the display section 14 is determined. However, an enlargement/reduction ratio r may be set, and the size of the display area may be set to have a width of [r·w] and a height of [r·h] with respect to the number of pixels (width w and height h) of the display section 14. Here, [*] denotes a maximum integer that does not exceed a number included in the square bracket or an integer closest to the number.

In addition, this enlargement/reduction ratio r may be determined each time the display area is moved in accordance with the size of the image element that is included in the circumscribed rectangle that includes the side that becomes the movement target.

[Display of Display Area]

Figure 13:
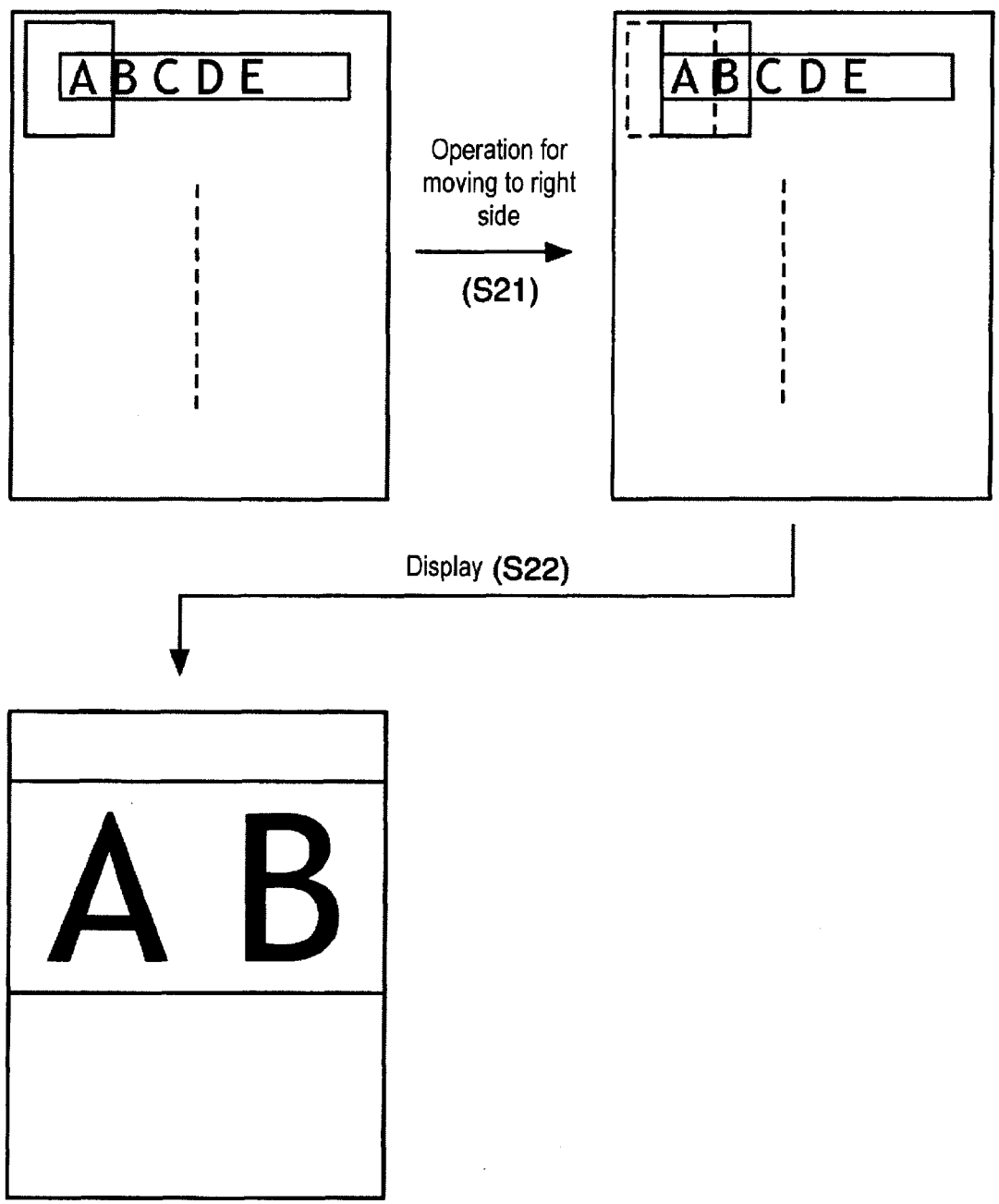
FIG. 13 is an explanatory diagram representing another operation example of the image processing apparatus according to the exemplary embodiment of the invention.

In this exemplary embodiment, the whole image and an outer circumferential line of the display area set in the image may be displayed in accordance with a user's command (FIG. 13), a process for moving the display area is performed in accordance with user's operation for moving the display area, and an outer circumferential line representing a destination display area may be redrawn (S21). In this case, when the user commands to display the display area represented by the outer circumferential line at an enlarged scale, the image in the display area surrounded by the outer circumferential line may be displayed on the display section 14 (S22).

[Example Implemented by Server]

In the above description, the example in which the image processing apparatus 1 includes the operation section 13 and the display section 14 has been described. However, the invention is not limited thereto. For example, the image processing apparatus 1 according to this exemplary embodiment may be configured to include a communication section not shown in the figure. In this case, the user's command operation may be received from a cellular phone, a terminal, or the like (hereinafter, referred to as a terminal-side device) that has the operation section and the display section, a process for changing the display area is performed, and information representing the display area after change is transmitted to the terminal-side device.

In such a case, the image processing apparatus 1 according to this exemplary embodiment transmits the image information that is a processing target, for example, to the terminal-side device. In addition, the information representing the display area may be transmitted, and an image in the display area is extracted to be displayed by the terminal-side deice (the processes as the display area extracting section 26 and the display processing section 27 are not performed).

In addition, as another exemplary embodiment, the whole image information that is the processing target may not be maintained necessarily in the terminal-side device. In other words, in this exemplary embodiment, the image processing apparatus 1 according to this exemplary embodiment generates information representing the display area in accordance with a command received from the terminal-side device, and an image in the display area that is determined based on the generated information is extracted from the image information that is the processing target. Then, the extracted image is transmitted to the terminal-side device to be displayed (the process as the display processing section 27 is not performed, and a part of the extracted image is transmitted to the terminal-side device).

What is claimed is:

1. An image processing apparatus comprising:
   an extracting unit that extracts a first part of an image, the first part is a processing target of a display area, the first part containing at least one second part;
   a detecting unit that sets the at least one second part of the image as a detection target area and detects at least one boundary of the at least one second part;
   a selecting unit that selects one of sides that corresponds to the at least one detected boundary; and
   a matching control unit that receives a command to match the selected side corresponding to the at least one detected boundary of the at least one second part with one side of the display area, and executes the command by matching the selected side corresponding to the at least one detected boundary of the at least one second part with one side of the display area.

2. The image processing apparatus according to claim 1, wherein the detecting unit sets the at least one second part of the image, which is in the display area, as a detection target area.

3. The image processing apparatus according to claim 1, wherein the detecting unit sets the at least one second part of the image, which is outside of the display area, as a detection target area.

4. The image processing apparatus according to claim 1, wherein
   when the image, which is the processing target, includes a plurality of image elements containing a plurality of characters, the selecting unit selects the one of the sides according to priorities that are determined based on a reading direction of the characters in advance for the respective sides, which constitute the boundary of the at least one second part.

5. The image processing apparatus according to claim 2, wherein
   when the image, which is the processing target, includes a plurality of image elements containing a plurality of characters, the selecting unit selects the one of the sides according to priorities that are determined based on a reading direction of the characters in advance for the respective sides, which constitute the boundary of the at least one second part.

6. The image processing apparatus according to claim 3, wherein
   when the image, which is the processing target, includes a plurality of image elements containing a plurality of characters, the selecting unit selects the one of the sides according to priorities that are determined based on a reading direction of the characters in advance for the respective sides, which constitute the boundary of the at least one second part.

7. The image processing apparatus according to claim 1, wherein
   when the image, which is the processing target, includes a plurality of image elements containing a plurality of characters, the selecting unit selects the one of the sides with prioritizing a side closer to a character, that is read earlier than the other characters, as compared with the other sides.

8. The image processing apparatus according to claim 2, wherein
   when the image, which is the processing target, includes a plurality of image elements containing a plurality of characters, the selecting unit selects the one of the sides with prioritizing a side closer to a character, that is read earlier than the other characters, as compared with the other sides.

9. The image processing apparatus according to claim 3, wherein
   when the image, which is the processing target, includes a plurality of image elements containing a plurality of characters, the selecting unit selects the one of the sides with prioritizing a side closer to a character, that is read earlier than the other characters, as compared with the other sides.

10. An image processing method comprising:
    extracting a first part of an image, the first part is a processing target of a display area, the first part containing at least one second part;
    setting the at least one second part of the image as a detection target area;
    detecting at least one boundary of the at least one second part;
    selecting one of sides that corresponds to the at least one detected boundary;
    receiving a command to match the selected side corresponding to the at least one detected boundary of the at least one second part with one side of the display area; and
    executing the command by matching the selected side corresponding to the at least one detected boundary of the at least one second part with one side of the display area.

11. The image processing method according to claim 10, wherein the setting sets the at least one second part of the image, which is in the display area, as a detection target area.

12. The image processing method according to claim 10, wherein the setting sets the at least one second part of the image, which is outside of the display area, as a detection target area.

13. The image processing method according to claim 10, wherein
    when the image, which is the processing target, includes a plurality of image elements containing a plurality of characters, the selecting selects the one of the sides according to priorities that are determined based on a reading direction of the characters in advance for the respective sides, which constitute the boundary of the at least one second part.

14. The image processing method according to claim 11, wherein when the image, which is the processing target, includes a plurality of image elements containing a plurality of characters, the selecting selects the one of the sides according to priorities that are determined based on a reading direction of the characters in advance for the respective sides, which constitute the boundary of the at least one second part.

15. The image processing method according to claim 12, wherein when the image, which is the processing target, includes a plurality of image elements containing a plurality of characters, the selecting selects the one of the sides according to priorities that are determined based on a reading direction of the characters in advance for the respective sides, which constitute the boundary of the at least one second part.

16. The image processing method according to claim 10, wherein when the image, which is the processing target, includes a plurality of image elements containing a plurality of characters, the selecting selects the one of the sides with prioritizing a side closer to a character, that is read earlier than the other characters, as compared with the other sides.

17. The image processing method according to claim 11, wherein when the image, which is the processing target, includes a plurality of image elements containing a plurality of characters, the selecting selects the one of the sides with prioritizing a side closer to a character, that is read earlier than the other characters, as compared with the other sides.

18. The image processing method according to claim 12, wherein when the image, which is the processing target, includes a plurality of image elements containing a plurality of characters, the selecting selects the one of the sides with prioritizing a side closer to a character, that is read earlier than the other characters, as compared with the other sides.

19. A non-transitory computer-readable medium storing a program that causes a computer to execute image processing, the image processing comprising:

extracting a first part of an image, the first part is a processing target of a display area, the first part containing at least one second part;

setting the at least one second part of the image as a detection target area;

detecting at least one boundary of the at least one second part;

selecting one of sides that correspond to the at least one detected boundary;

receiving a command to match the selected side corresponding to the at least one detected boundary of the at least one second part with one side of the display area; and performing the command by matching the selected side corresponding to the at least one detected boundary of the at least one second part with one side of the display area.

20. The non-transitory computer-readable medium according to claim 19, wherein the setting sets the at least one second part of the image, which is in the display area, as a detection target area.

21. The image processing apparatus according to claim 1, wherein the display area is limited to contents of the image.

22. The image processing apparatus according to claim 1, wherein the at least one second part is at least one image element, each of the at least one image element is a character string, a picture area, or a line drawing area.

23. The image processing apparatus according to claim 1, wherein the matching control unit zooms in on a portion of the at least one second part such that the selected side of the at least second part is aligned with the one side of the display area.

24. The image processing apparatus according to claim 1, wherein the image processing apparatus is a mobile device.

* * * * *